United States Patent [19]

Lampert

[11] Patent Number: 5,461,690
[45] Date of Patent: Oct. 24, 1995

[54] BEND-LIMITING APPARATUS FOR A CABLE

[75] Inventor: Norman R. Lampert, Norcross, Ga.

[73] Assignee: AT&T IPM Corp., Coral Gables, Fla.

[21] Appl. No.: 282,936

[22] Filed: Jul. 29, 1994

[51] Int. Cl.⁶ .................................................. G02B 6/44
[52] U.S. Cl. .......................... 385/100; 385/76; 385/86; 385/139
[58] Field of Search ............................. 385/69, 75, 76, 385/86, 87, 88, 100, 102, 109, 114, 134, 139

[56] References Cited

U.S. PATENT DOCUMENTS

| | | | |
|---|---|---|---|
| 4,787,706 | 11/1988 | Cannon, Jr. et al. | 385/59 |
| 4,801,764 | 1/1989 | Ohlhaber | 385/114 X |
| 4,812,009 | 3/1989 | Carlisle et al. | 385/62 |
| 5,073,044 | 12/1991 | Egner et al. | 385/86 |
| 5,138,678 | 8/1992 | Briggs et al. | 385/86 |
| 5,151,962 | 9/1992 | Walker et al. | 385/86 |
| 5,181,267 | 1/1993 | Gerace et al. | 385/86 |
| 5,202,942 | 4/1993 | Collins et al. | 385/87 |
| 5,212,752 | 5/1993 | Stephenson et al. | 385/78 |
| 5,261,019 | 11/1993 | Beard et al. | 385/60 |

*Primary Examiner*—John D. Lee
*Attorney, Agent, or Firm*—Michael A. Morra

[57] ABSTRACT

A bend-limiting apparatus 20 for attachment to an optical connector 10 has a generally cylindrical shape and includes an axial bore 28 along its central axis for holding an optical cable 30. The front end 22 of the bend-limiting apparatus attaches to the optical connector and has an outside diameter which is comparable in size to the connector. The back end of the bend-limiting apparatus has an outside diameter which is comparable in size to the optical cable. The bend-limiting apparatus is made from a flexible material which is sufficiently stiff to accommodate heavy side loads, but includes a number of grooves 23 that are exclusively positioned on its back half to accommodate light side loads. These grooves preferably extend from an outside surface 29 of the apparatus into the axial bore, and also extend in a circumferential direction at least part way around the apparatus. Such a design effectively limits the minimum bend radius of an optical cable over a wide range of side loads.

13 Claims, 7 Drawing Sheets

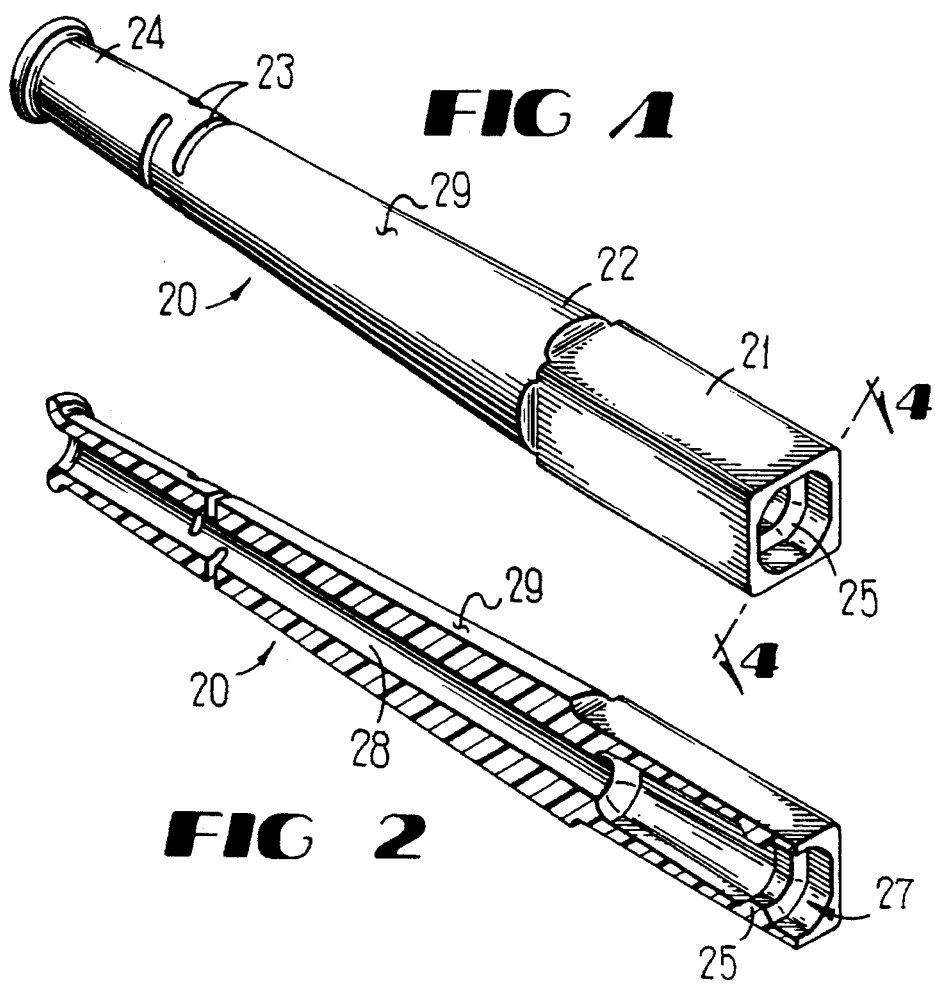
FIG 1
FIG 2
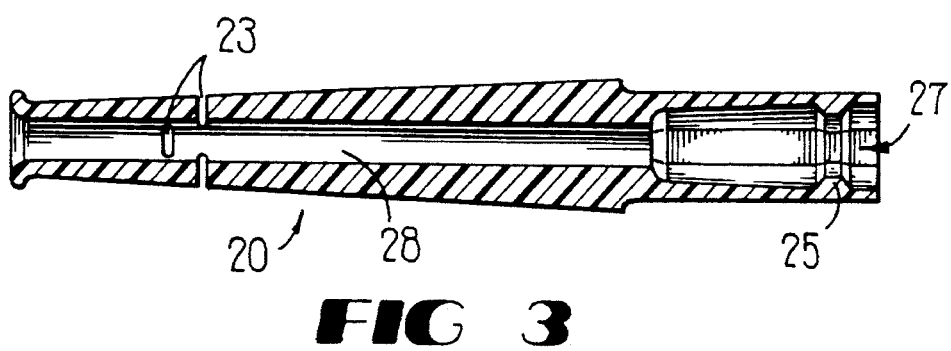
FIG 3
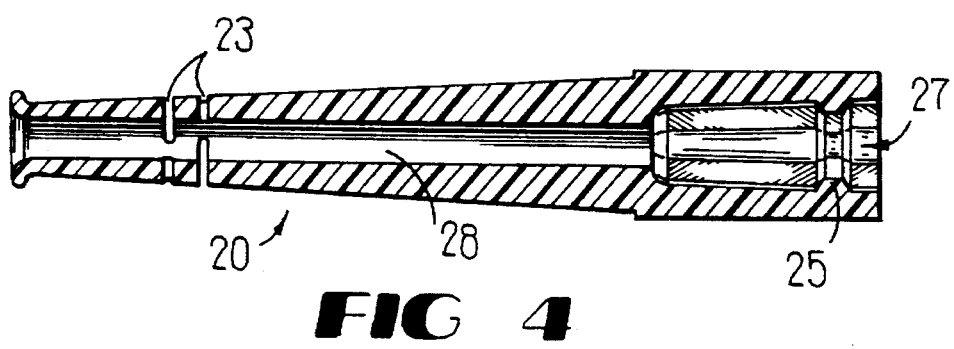
FIG 4

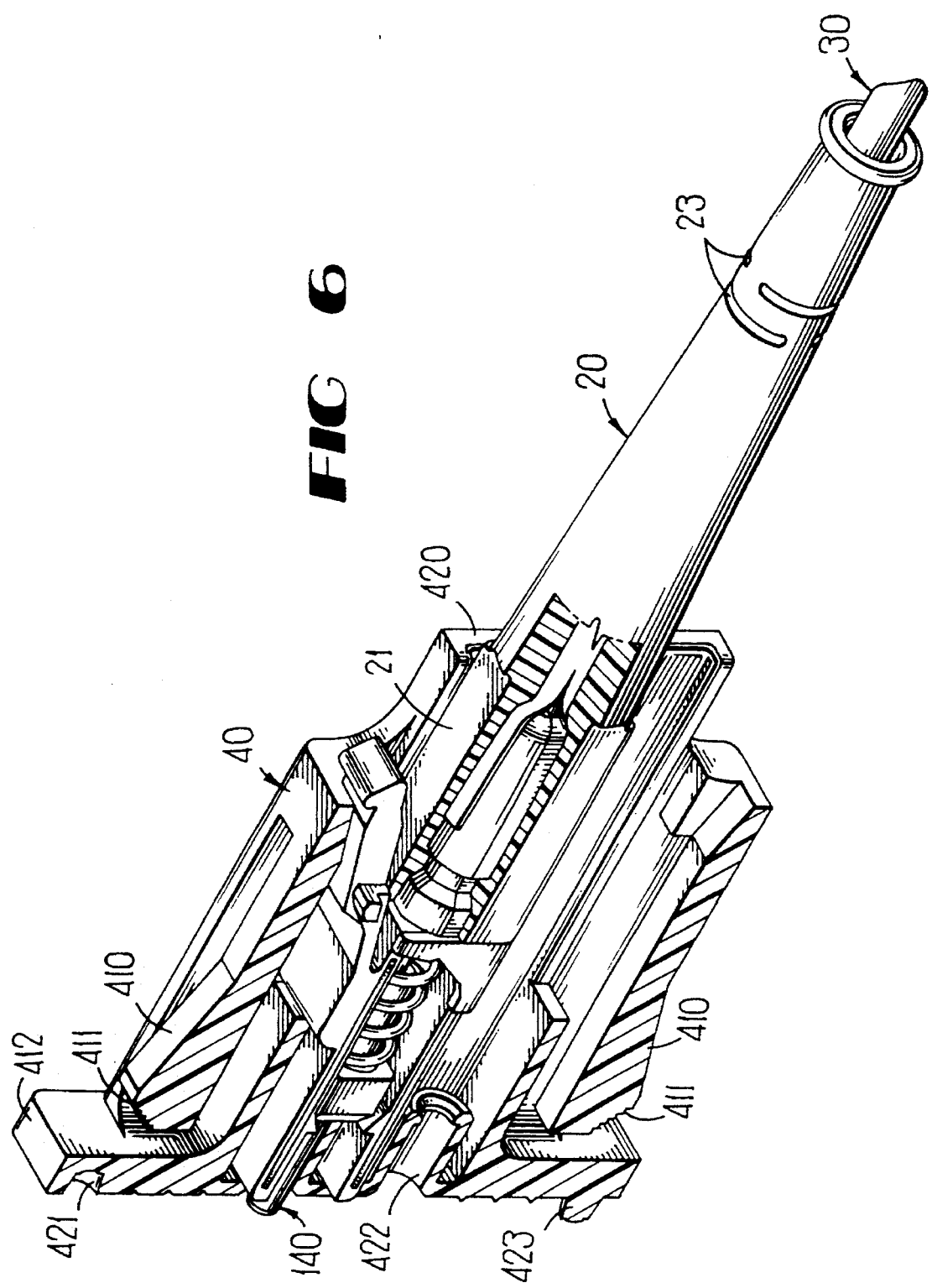

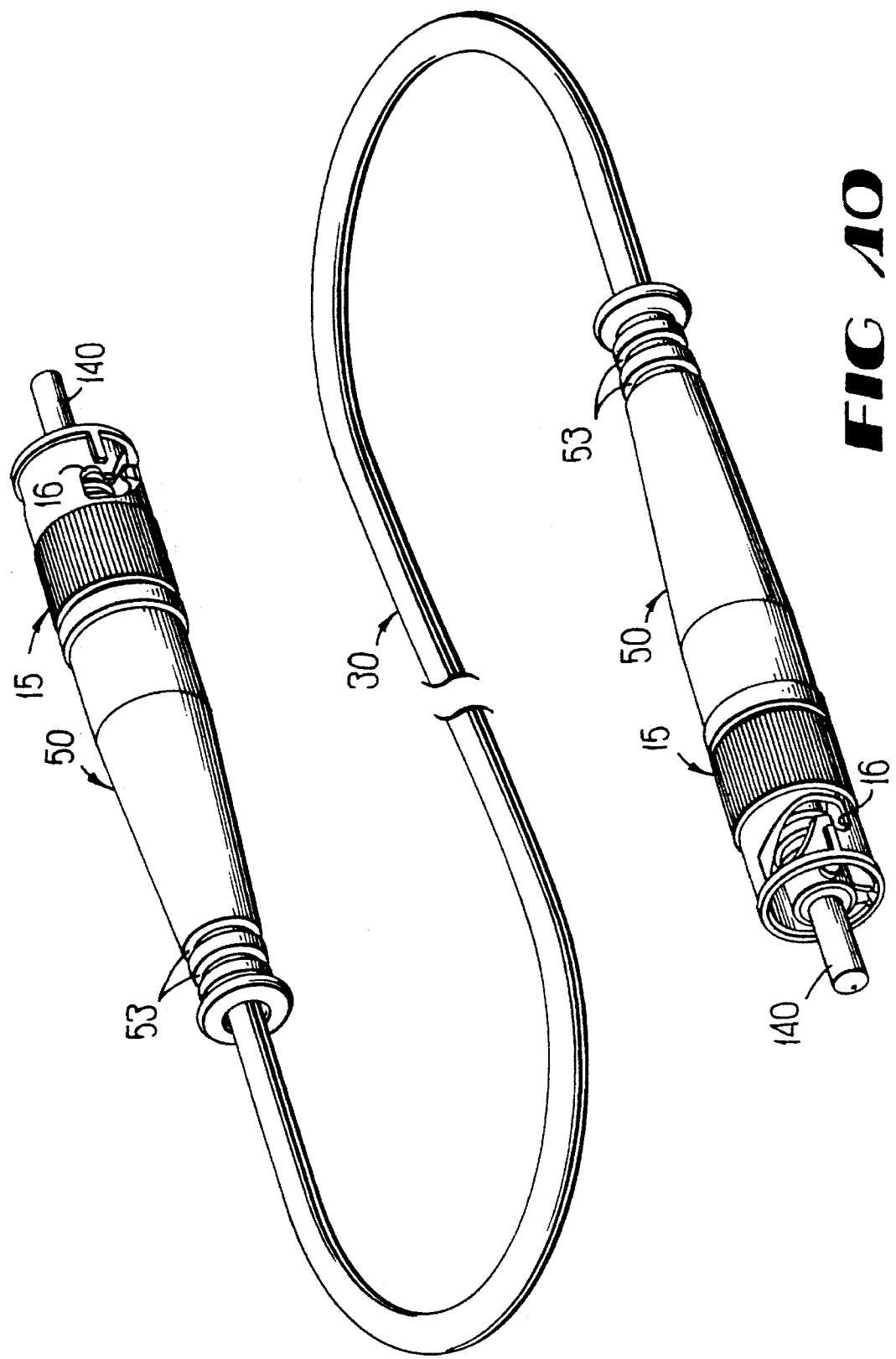

BEND-LIMITING APPARATUS FOR A CABLE

TECHNICAL FIELD

This invention generally relates to a cable support device, and more particularly to apparatus for limiting the minimum bend radius of a communications cable.

BACKGROUND OF THE INVENTION

Optical fiber connectors are an essential part of substantially any optical fiber communication system. For instance, such connectors may be used to join segments of fiber into longer lengths; to connect fiber to active devices such as radiation sources, detectors and repeaters; or to connect fiber to passive devices such as switches and attenuators. The central function of an optical fiber connector is the maintenance of two optical fiber ends such that the core of one of the fibers is axially aligned with the core of the other fiber. When the ends are aligned properly, there will be little or no connection loss due to core misalignment.

However, not all of the loss in an optical fiber connection is attributable to core misalignment. Sharp bends in the optical fiber itself cause substantial loss in a lightwave signal, particularly at long wavelengths (1550 nanometers) now being used for the highest data transmission speeds. When the optical fiber is bent in a curved path, the smaller the bend radius, the greater the path loss. This is especially true for matched-clad, singlemode fiber (as compared to depressed-clad, singlemode fiber). However, if the bend radius is sufficiently large, then path loss is not a concern. Bending occurs during cable placement and occasionally occurs when the cable, which contains the optical fiber, is routed around a sharp corner or becomes "kinked" due to handling. More frequently, sharp bends occur in the region where the connector is plugged into a panel, and its attached cable needs to be bent (usually by 90°) to be routed to its destination. Indeed, such panels are frequently equipped with access doors which, when closed, press against the back portion of the connector and cause its associated cable to bend sharply. Such bending also occurs when a jumper (comprising an optical cable and a connector) is inserted into a receptacle and the cable is pulled in a direction which is perpendicular to the central axis of the connector. The sharp bend at the junction where the cable attaches to the connector causes excessive transmission loss in the lightwave signal.

Strain-relief boots are well-known devices for transferring axial tension from the cable to the connector, and they also function to limit the amount of bending that can occur at the junction where the cable is joined to the connector. Such boots are generally cylindrical and surround the optical cable at the cable/connector junction. The diameter of the boot is approximately equal to the diameter of connector where they meet, and it tapers to the diameter of the cable where the cable enters the boot. One popular design of a strain-relief boot includes a number of bend-limiting segments which are separated from each other by a gap that is approximately equal to the width of each segment. When the cable is bent, the segment portions on the inside of the bend come closer together until they finally touch, thereby limiting the minimum radius of the bend. While such designs provide acceptable results over a narrow range of side loads, they have not been completely successful over side loads that range, for example, from 0.5 to 10 pounds. Nevertheless, such wide ranges are routinely encountered during normal handling. Depending on the material used for the bend-limiting boot, and its pattern of segments, sharp bending will either occur at the junction where the cable meets the boot (light load), or sharp bending will occur at the junction where the boot meets the connector (heavy load). In either event, excessive transmission loss will be experienced by lightwave signals traveling within the optical cable when the bend is too sharp.

It is noted that bend-limiting boots can be designed to handle a very wide range of side loads if the dimensions of the boot are unconstrained. For example, a cone-shaped boot having a large diameter at one end, a narrow diameter at the other end, and a very long distance between these ends can be designed to satisfy virtually any load range. However, as a practical matter, the size (diameter) of the bend-limiting boot should be approximately equal to the size of the connector where they join together, and the boot cannot be too long. Seemingly, the prior art has not provided a bend-limiting boot for use with optical connectors which is compact and yet capable of handling a wide range of side loads.

SUMMARY OF THE INVENTION

A novel bend-limiting apparatus for attachment to a connector is disclosed. The apparatus has a generally cylindrical shape and includes an axial bore along its central axis for holding a cable. The front end of the bend-limiting apparatus is adapted to be attached to the back end of the connector. The bend-limiting apparatus is made from a flexible material which is sufficiently stiff to limit the minimum bend radius of the cable under heavy side loading. The apparatus further includes a number of circumferential grooves that extend at least part way around the bend-limiting apparatus. These grooves are confined to the back haft of the apparatus and limit the minimum bend radius of the cable under light side loading.

In a preferred embodiment of the invention, the outside diameter of the apparatus is tapered from front to back. At its front end, the diameter is comparable in size to the connector; and at its back end, the diameter of the apparatus is comparable in size to the cable.

In the preferred embodiment, the grooves of the apparatus extend into the axial bore from the outside surface, and the flexible material comprises an elastomer having a hardness of approximately Shore 50 D. Additionally, the front end of the bend-limiting apparatus includes a portion having a generally square cross section for insertion into a mating opening of a receptacle. This square portion comprises about 20% of the length of the bend-limiting apparatus and, when inserted into the receptacle, increases the amount of support to resist side loading that can be applied to the bend-limiting apparatus.

In the preferred embodiment of the invention, the bend-limiting apparatus is combined with an optical connector, and an optical cable with yarn-like strength members that surround an optical fiber within the cable. The apparatus includes a cavity at its front end which is adapted to receive the back end of the connector capture the strength members therebetween, thus providing strain relief for the cable as well as limiting its minimum bend radius.

BRIEF DESCRIPTION OF THE DRAWING

The invention and its mode of operation will be more clearly understood from the following detailed description when read with the appended drawing in which:

FIG. 1 is a front, top and right-side perspective view of a bend-limiting apparatus for optical fiber connectors;

FIG. 2 is a cross section of the bend-limiting apparatus of FIG. 1, and is also shown in perspective view;

FIG. 3 is a cross section of the bend-limiting apparatus of FIG. 1 shown in elevation view;

FIG. 4 is a cross section of the bend-limiting apparatus of FIG. 1, shown along a diagonal cut;

FIG. 6 is a partial cross section of the bend-limiting apparatus attached to an optical connector, both shown inserted into a receptacle.

FIG. 10 discloses a jumper comprising an optical connector, a bend-limiting apparatus in accordance with the invention, and an optical cable.

DETAILED DESCRIPTION

Figure 5:
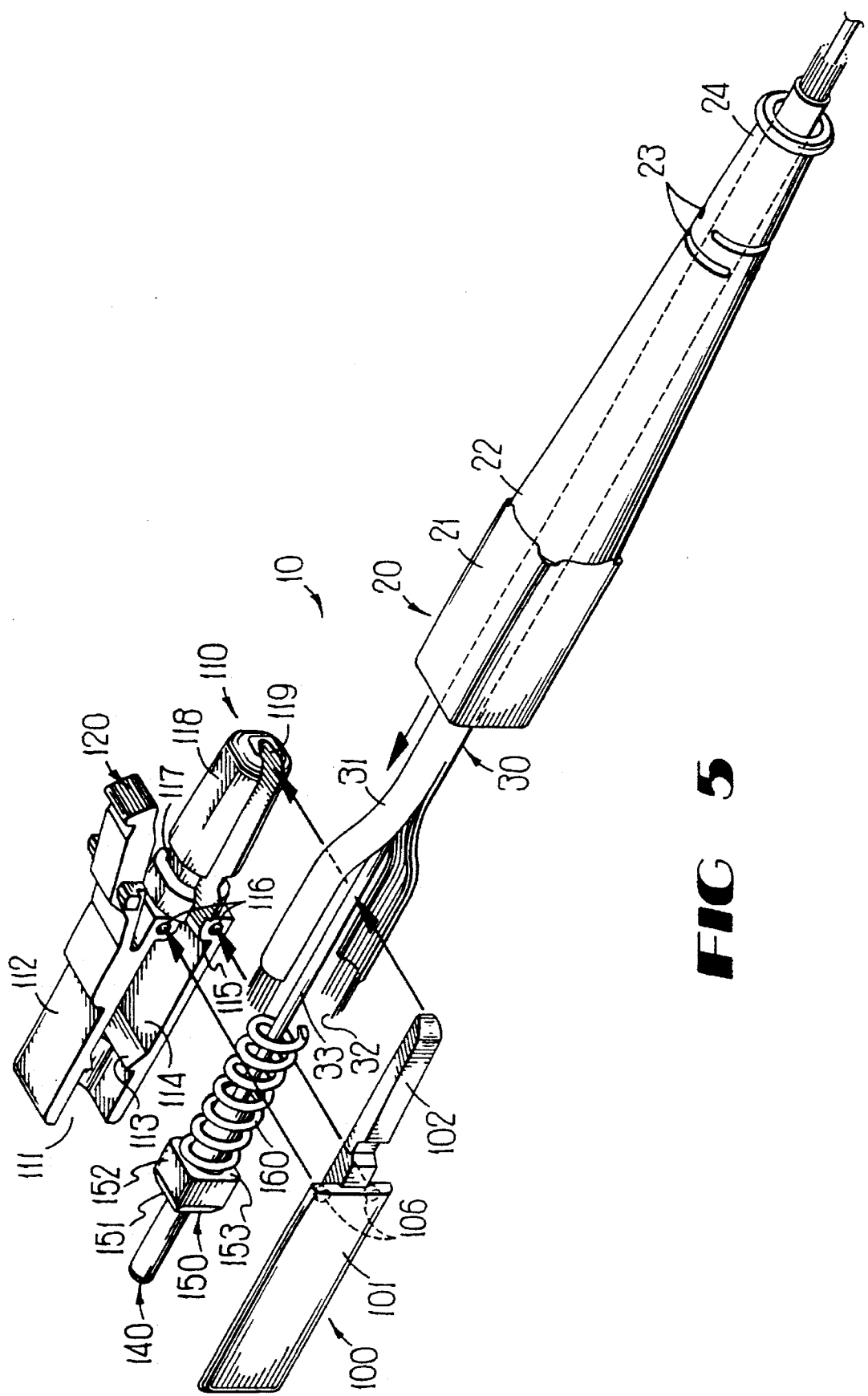
FIG. 5 is an exploded perspective view of an optical connector together with the bend-limiting apparatus of FIG. 1–4 and an optical cable.

Reference is made to FIG. 1 which shows a front, top and right-side perspective view of a bend-limiting apparatus 20 in accordance with the present invention. Bend-limiting devices are typically used to limit the minimum radius of a bend in a communications cable where it attaches to a connector. The apparatus of the present invention comprises a tapered cylinder having one diameter at its front end 22, and a smaller diameter at its back end 24. The bend-limiting apparatus is made from a flexible material and includes an axial bore 28 (shown in FIG. 2–4) that extends from one end to the other along a central, longitudinal axis which is designed to hold the cable. The front end of the bend-limiting apparatus includes a portion 21 having a square cross section that inserts into a mating receptacle. Portion 21 comprises about 20% of the length of apparatus 20 and helps transfer bending stress from the apparatus to the receptacle. Axial bore 28 extends into a cavity 27 that is adapted to receive the back end of a connector (see FIG. 2–4). Several grooves 23 are molded into the back half portion of the apparatus and function to increase the flexibility of the apparatus when light side loads are applied to the cable. These grooves 23 are specifically confined to the back half of the apparatus so that the same flexible material can be used throughout while still eliminating sharp cable bends under both heavy and light side loads. In a preferred embodiment of the invention, the grooves 23 extend into the axial bore 28 from an outside surface 29 of the apparatus, and the flexible material comprises an elastomer having a hardness of approximately Shore 50 D. In the preferred embodiment of the invention, the bend-limiting apparatus is also used to provide strain relief for the cable within the axial bore, and interior flange 25 cooperates with a groove within an associated connector, as discussed in FIG. 5, to provide strain relief for the cable. And while the benefits of this design accrue mainly to cables containing optical fibers, the bend-limiting apparatus may be advantageously used with cables containing copper wires also. FIG. 2–4 show various cross-sectional views of the bend-limiting device of FIG. 1 to illustrate its construction in greater detail.

FIG. 5 is an exploded perspective view of an optical connector combined with an optical cable and the bend-limiting apparatus shown in FIG. 1–4, illustrating their cooperative association. In particular, FIG. 5 discloses construction details of a connector 10 which includes a housing assembly 100, 110; and a fiber-holding structure comprising ferrule 140, base member 150, and spring 160 which is disposed about the base member. Although the housing assembly is shown as two separate pieces that are bonded together, it can be constructed as a one-piece unit or a multi-piece assembly. As shown in FIG. 5, housing 110 is a generally U-shaped device having a cavity 114 for receiving the fiber-holding structure. Once the fiber-holding structure is inserted into the cavity of housing 110, cover 100 is bonded thereto. Cover 100 includes pins 106–106 which mate with holes 116—116 in housing 110 for alignment. Once joined together, the front end of the connector has a generally square shape which fits into a receptacle 40 (see FIG. 6) that is shaped to receive same. Top surface 112 and left-side surface 101 comprise two of the four outside surfaces that form the front end of connector 10. The back end of connector 10 is conically shaped with four flat areas, spaced 90° apart, that are used to position the back end of the connector within the front end of bend-limiting apparatus 20. Top surface 118 and left-side surface 102 comprise two of the four flat surfaces at the back end of connector 10. Housing members 100, 110 include a plurality of interior surfaces that define cavity 114 which surrounds the fiber-holding structure. The connector includes a first opening 119 at its back end which receives an optical cable 30 and a second opening 111 at its front end for enabling the end face of the fiber-holding structure to protrude therethrough. These openings 111, 119 extend into cavity 114 and are positioned at opposite ends of connector 10. Housing members 100, 110 are molded from a thermoplastic material and have been designed to be molded for straight pulls, without cams, to reduce mold and part costs. It is noted that spring latch 120 is molded into the top surface 112 of the housing 110.

Similar to the outside surface of the connector, interior cavity 114 also has a generally square shape. A flange 113 within housing 110 includes a sloped surface which is shaped to interface with chamfered surface 151 of flange 152 on the base member 150. Moreover, flange 152 is shaped to enable it to be supported within cavity 114 in several different stable positions—each one having a different rotational orientation with respect to the central axis of the fiber-holding structure. Flange 152 is square and thus provides 4 stable positions for orientating the fiber-holding structure so that fiber eccentricity can be changed. Compression spring 160 surrounds the back cylindrical portion of base member 150. It presses against surface 153 of the flange and against surface 115 within cavity 114 of housing member 110. Spring 160 urges the end face of the fiber-holding structure through opening 111.

Ferrule 140 may be a glass, metal, ceramic or plastic cylinder having a narrow passageway (about 126 μm in diameter) through its central axis for receiving an end portion of an optical fiber. In this illustrative connector, the ferrule has an outer diameter of about 1.25 mm and a length of about 7.0 mm. In the construction of an optical cable 30, a thin glass fiber is typically coated with two layers of ultraviolet-curable materials (polyacrylate for example) for protection. The coated fiber is then covered with a thermoplastic having sufficient stiffness to preclude fiber buckling and is referred to as a buffered fiber 33. To withstand tensile forces that might otherwise fracture the buffered fiber, the cable is constructed with a load-bearing portion in the form of strength members 32 that surround the buffered fiber 33. Elongated slender polymeric fibers of high tensile strength, such as aramid yarn, are suitable for use in this regard. An outer jacket 31 comprising polyvinyl chloride, for example, surrounds the buffered fiber and strength members to complete the construction of optical cable 30. As the cable diameter is made smaller (with the same type fiber), path loss due to cable bending becomes more of a concern. The section modulus that affects bend performance is an exponential function of the diameter. As connectors become smaller, then cables having smaller diameters will become more common. The present invention illustratively uses a cable with a diameter of 1.6 mm—which is substantially smaller than typical interconnection cables having diameters of 2.0 mm, 2.4 mm, and 3.0 mm.

These layers of different materials are all stripped from an end portion of the glass fiber prior to its insertion into ferrule 140. An adhesive is injected into the passageway through the central axis of ferrule 140. Then the uncoated portion of the optical fiber is inserted into the passageway of the ferrule and adhesively attached. The spring 160 is precompressed on the ferrule/base member subassembly 140/150 with cable, and is placed into housing 110. Housing cover 100 is then installed and ultrasonically bonded, for example. Strength members 32 (e.g., aramid fibers) of the cable 30 are adhesively attached to the back end of connector 10 and pressed into a circumferential groove 117 by a mating flange 25 (see FIG. 1–4) within the bend-limiting strain-relief boot 20. Both the cable jacket 31 and the strength members 32 are "sandwiched" between the boot and the back end of connector 10. A suitable adhesive for joining the strength members together with the boot and the connector is Hysol 151—a commercially available, two-part epoxy. When an axial pull of up to 15 pounds is applied to cable 30, it is desirable that it remain attached to connector 10. And while adhesives are preferable, a crimping sleeve may alternatively be used to join the strength members 32, and/or outer jacket 31 of the cable, to the connector.

Bend-limiting strain-relief boot 20 is about 38 mm long and includes a generally square portion at its front end whose sides are each about 4.6 mm. It is made from a suitably compliant material so that its back portion can be bent in a direction that is perpendicular to its longitudinal axis. In the preferred embodiment of the invention, the strain-relief boot is made from a thermoplastic rubber such as Santoprene® elastomer which is commercially available from Advanced Elastomer Systems, LP. So that the bending properties of the boot 20 are suitable for limiting the bend radius of the enclosed cable 30 to no less than 20 mm over a prescribed load range, the preferred thermoplastic rubber is designated 253-50 and has a hardness rating of 50 D. Additionally, a portion of boot 20 is conically shaped and tapers from a maximum diameter of about 5.6 mm at one end 22 to a minimum diameter of about 3.0 mm at the other end 24. Not only does the boot 20 provide strain relief for cable 30, but it also insures that the cable can withstand repeated bends after interconnection without undue stress being imparted to the glass fiber.

At the front end of bend-limiting boot 20, a generally square portion 21 occupies approximately 20 percent of the entire length of the boot. This portion is adapted to be received into a mating opening of a receptacle 40 (see FIG. 6) to transfer bending stress from the boot 20 to the receptacle, and advantageously remove stress from the connector/cable junction. The operation of grooves 23 are discussed in connection with FIG. 9A–9C.

FIG. 6 shows an optical fiber connector inserted within a duplex receptacle 40 which accommodates two such connectors. Receptacle 40 installs in a rectangular opening of a flat panel by pushing its narrow end through the opening. The receptacle is held therein by grooves 411 in spring latch 410, and may be removed from the panel by squeezing the spring latch and pushing the receptacle forward. Typically, two identical receptacles 40—40 are joined by bonding their flanges 412 together end-to-end before insertion into the panel. Mating portions 421,423 are used to assure proper alignment. Nevertheless, so that the ferrules 140 within the connectors are perfectly aligned, specially designed alignment sleeves are installed in cylindrical openings 422 before the receptacles are joined. Sidewall 420 at the back end of receptacle 40 provides lateral support to the square portion 21 of bend-limiting device 20. Sidewall 420 generously extends beyond the minimum depth of the receptacle needed to hold the connector.

Figure 7A:
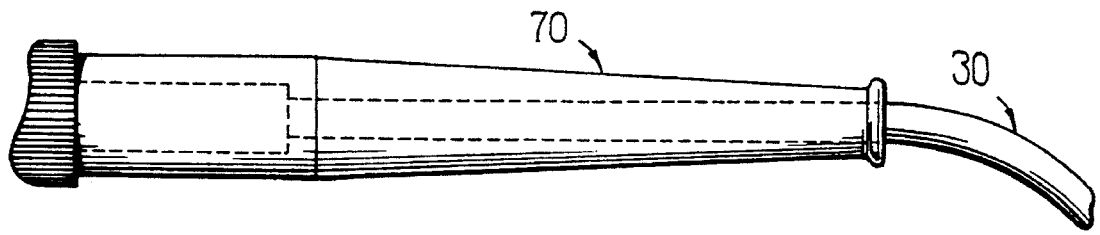
FIG. 7A–7C discloses one prior art, bend-limiting device under three different load conditions in which excessive bending occurs during the application of light side loads.
Figure 7B:
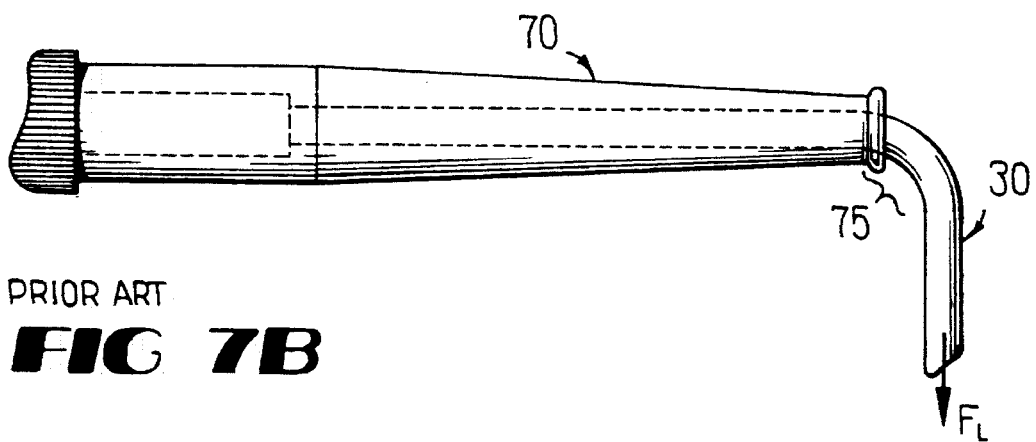
Figure 7C:
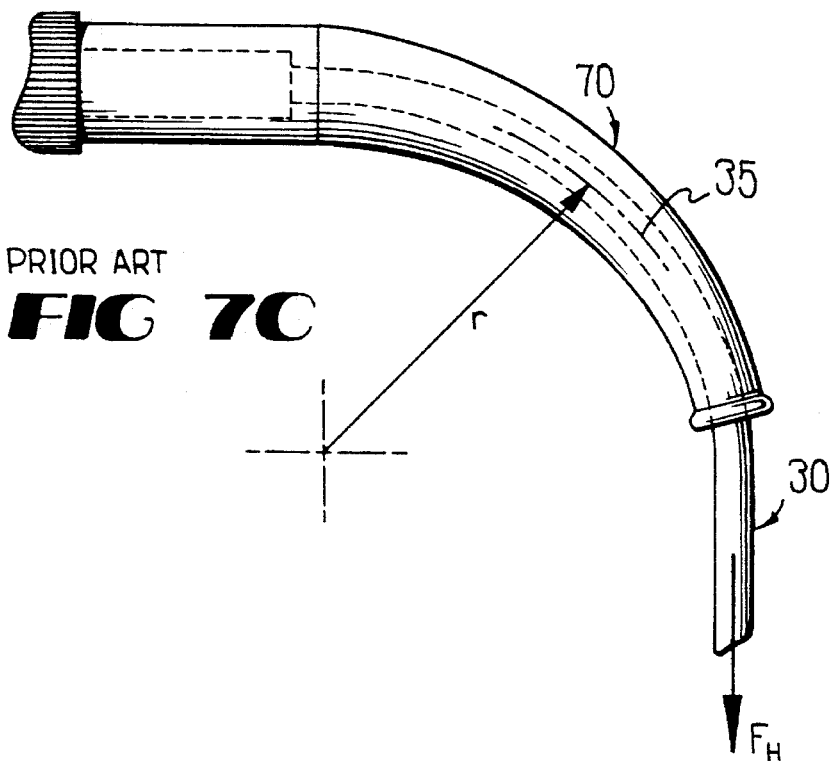

Reference is now made to FIG. 7A–7C which disclose a prior art bend-limiting device 70. In these figures the material used in the construction of device 70 is selected to handle heavy side loads better than light side loads. For example, FIG. 7A shows the rest position of bend-limiting device 70 when no downward force is applied to the optical cable 30. FIG. 7B illustrates the condition in which a light downward force $F_L$ is applied to cable 30, but bend-limiting device 70 is too rigid to yield to such light side loads, and so the optical cable itself must accommodate the bending force which results in a bend radius that is too small in the region designated 75. In this situation, lightwave signals traversing region 75 experience too much path loss. FIG. 7C illustrates the condition in which a heavy downward force $F_H$ is applied to cable 30. Here, the minimum bend radius is larger than the minimum bend radius shown in FIG. 7B which results in lower path loss. Additionally, FIG. 7C is used to illustrate the meaning of a "minimum bend radius" which is the radius "r" of the smallest circle whose circumference is collinear with a portion of the fiber which is located approximately at the central axis 35 of the cable.

Figure 8A:
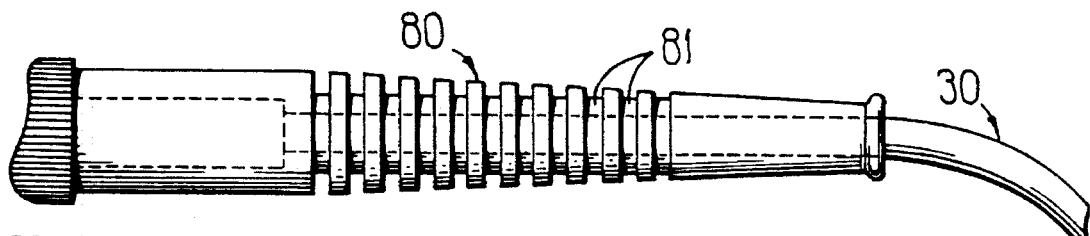
FIG. 8A–8C discloses another prior art, bend-limiting device under three different load conditions in which excessive bending occurs during the application of heavy side loads.
Figure 8B:
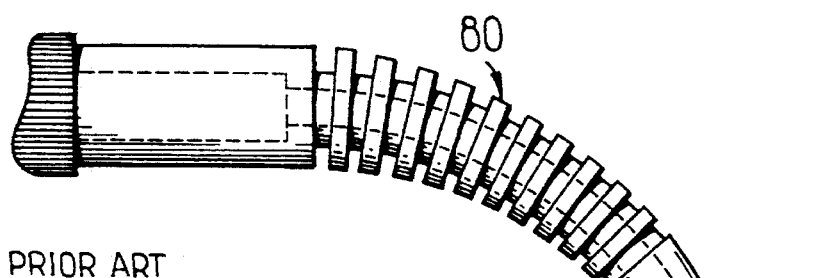
Figure 8C:
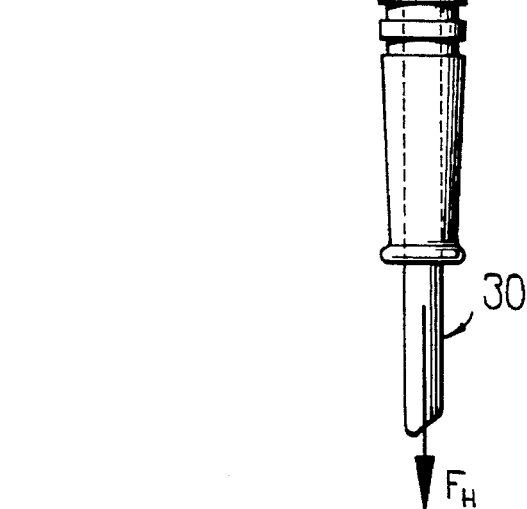

Referring now to FIG. 8A–8C, bend-limiting device 80 is shown having a number of segments 81—81 that enable the bend-limiting device to yield more easily during a condition of light side loading, but is unacceptable during heavy side loads. In this prior art example, the same material is used in molding the bend-limiting device 80 as was used in molding bend-limiting device 70 (see FIG. 7A–7C). Segmentation of the bend-limiting device allows it to yield more easily to light downward forces $F_L$ as indicated in FIG. 8B. It is noted that the problem of sharp bends under light loads, as previously demonstrated in FIG. 7B, is now solved. However, as FIG. 8C illustrates, heavy downward forces $F_H$ applied to cable 30 result in too much bending in region 85, and lightwave signals traversing this region will experience too much loss. It is noted that similar results could have been achieved in FIG. 8A–8C by eliminating the segments and using a more flexible material for the construction of bend-limiting device 80.

Figure 9A:
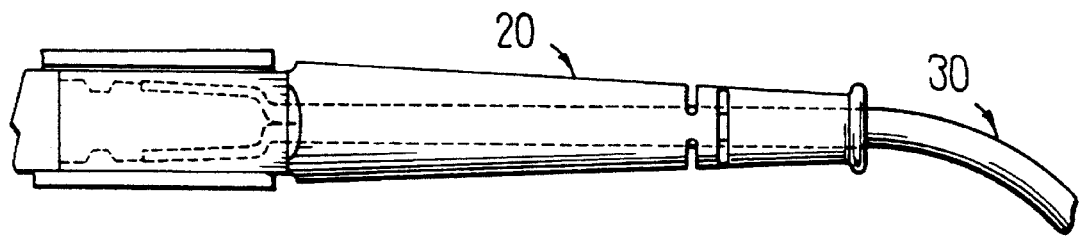
FIG. 9A–9C discloses the bend-limiting apparatus of FIG. 1–4 under three different load conditions.
Figure 9B:
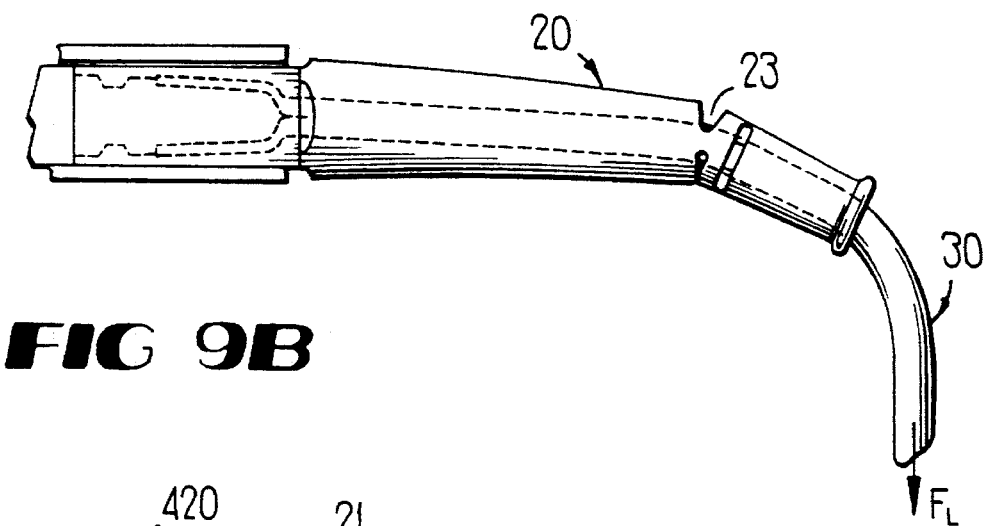
Figure 9C:
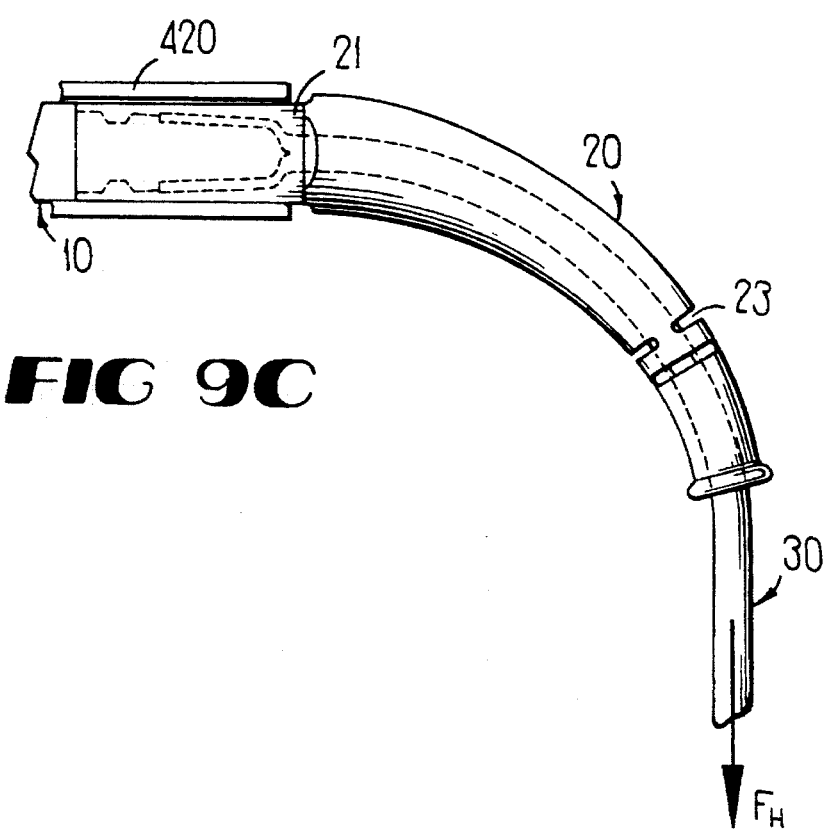

FIG. 9A–9C illustrate the advantages of the present invention under different side load conditions. FIG. 9A shows the rest position of an optical cable 30 and bend-limiting apparatus 20 when no downward force is applied to the optical cable. The grooves 23 in the back half of the bend-limiting apparatus 20 allow it to yield more readily when light downward forces $F_L$ are applied to cable 30 as indicated in FIG. 9B. In the preferred embodiment of the invention these grooves fully extend into the axial bore; and so each groove does not completely encircle the apparatus—otherwise it would detach. In order to accommodate bending in various directions, two rows of grooves are used and the same groove pattern is repeated—but rotated by 90°. These grooves provide a loose hinge action in bend-limiting apparatus 20 which is particularly effective for smaller cables and light side loads. However, as will be illustrated in connection with FIG. 10, these grooves need not fully extend into the axial bore. Finally, FIG. 9C illustrates the condition in which a heavy downward force $F_H$ is applied to cable 30 in which bend-limiting apparatus 20 provides suitable results. These results are achieved by using a sufficiently stiff material to accommodate heavy side loads and grooves in the back half of the apparatus to accommodate light side loads. Such a design avoids the need for a particularly long bend-limiting apparatus. FIG. 9C also illustrates the cooperation between portion 21, at the front end of apparatus 20, and sidewall 420 of an associated receptacle which receives connector 10. It is noted that portion 21 is "sandwiched" between the connector and the sidewall which further improves the bend-limiting apparatus by transferring bending stresses away from the cable/connector junction.

FIG. 10 discloses a jumper comprising a cable 30 which is terminated at each end with an optical connector 15 and a bend-limiting device 50. In this figure, a slightly different optical connector is used (known as an ST®-connector). Connector 15 includes a ferrule 140 having an optical fiber installed along its central axis, and a bayonet-style connection means having a camming surface 16 for interlocking with a mating device. Of particular interest, however, is a second embodiment of bend-limiting apparatus 50 which includes circumferential grooves 53 that do not fully extend into the axial bore. Nevertheless, similar to the preferred embodiment of the invention shown in FIG. 1–6, apparatus 50 comprises a sufficiently stiff material to accommodate heavy side loads, and grooves confined to the back half of the apparatus for accommodating light side loads.

Although various particular embodiments of the invention have been shown and described, modifications are possible within the spirit and scope of the invention. These modifications include, but are not limited to, the use of different materials in the construction of the bend-limiting apparatus. For example, although an elastomer is disclosed, other thermoplastic materials are possible. And even though glass fibers are the primary beneficiary of the invention, other light-carrying fibers (e.g., plastic fibers) may be used. Additionally, the bend-limiting apparatus may also be used with cables having metallic conductors. Finally, the bend-limiting apparatus need not be cylindrical or tapered from front to back, but rather may comprise a substantially constant shape over its entire length.

I claim:

1. Apparatus for limiting the bending radius of a cable that is attached to a connector, said apparatus comprising (i) a connector-engaging portion which engages the connector, and (ii) a bend-limiting portion which surrounds the cable in the region where it is attached to the connector, the apparatus comprising an elongated structure having an outside surface, the apparatus further comprising an axial bore which extends along a central axis of the elongated structure from a front end to a back end thereof for supporting the cable, said apparatus being made from a flexible material which is sufficiently stiff to limit the minimum bend radius of the cable under heavy side loading

CHARACTERIZED BY a plurality of circumferential grooves that extend at least part way around the apparatus and fully penetrate the bend-limiting apparatus from the outside surface to the axial bore, said grooves being confined to the back half of the bend-limiting portion of the apparatus for limiting the minimum bend radius of the cable under light side loading.

2. The bend-limiting apparatus of claim 1 wherein the outside dimensions of the elongated structure taper from the front end to the back end.

3. The bend-limiting apparatus of claim 1 wherein the flexible material comprises a thermoplastic elastomer.

4. The bend-limiting apparatus of claim 3 wherein the elastomer has a hardness of approximately Shore 50 D.

5. The bend-limiting apparatus of claim 1 further including a portion at its front end having a generally square cross section and a length which is approximately 20 percent of the overall length of the bend-limiting apparatus.

6. In combination, a communications cable joined to a connector and a bend-limiting device, the communications cable including a signal transmission medium enclosed within a plastic jacket;

the connector including a plug for connecting signals from the transmission medium to another connector; and the device comprising (i) a connector-engaging portion which engages the connector, (ii) an axial bore along its central axis, and (iii) a bend-limiting portion which surrounds the communications cable in the region where it is joined to the connector, said device being made from a flexible material which is sufficiently stiff to limit the minimum bend radius of the cable under heavy side loading, said device including a plurality of circumferential grooves that extend at least part way around the device, extend into the axial bore, and are confined to the back half of the bend-limiting portion of the device for limiting the minimum bend radius of the cable under light side loading.

7. The combination of claim 6 wherein the bend-limiting device includes a tapered cylinder portion having a diameter which is greater at one end where it attaches to the connector than at the other end where it receives the communications cable.

8. The combination of claim 6 wherein the communications cable includes a light-carrying fiber.

9. The combination of claim 8 wherein the light-carrying fiber is made from glass, said cable further including a plurality of yarn-like strength members surrounding the glass fiber.

10. In combination, an optical cable joined to an optical connector and a bend-limiting device, the optical cable comprising a light-carrying fiber enclosed within a plastic buffer material;

the connector comprising (i) a fiber-holding structure having an axial passageway which receives the optical fiber and which terminates in an end face that is perpendicular to the passageway, and (ii) a housing having internal surfaces that define a cavity and surround the fiber-holding structure; and the device comprising (i) a connector-engaging portion which engages the connector, (ii) an axial bore along its central axis, and (iii) a bend-limiting portion which surrounds the cable in the region where it is joined to the connector, the device being made from a flexible material which is sufficiently stiff to limit the minimum bend radius of the optical cable under heavy side loading, said bend-limiting device including a plurality of circumferential grooves that extend at least part way around the device, extend into the axial bore, and are confined to the back half of the bend-limiting portion of the device for limiting the minimum bend radius of the optical cable under light side loading.

11. A jumper comprising a communications cable terminated in a connector at each end, at least one of said connectors including a bend-limiting device having an axial bore along its central axis which holds the communications cable;

the communications cable including a signal transmission medium enclosed within a dielectric jacket;

the connector including a plug for connecting signals from the transmission medium to another connector; and the device comprising (i) a connector-engaging portion which engages the connector, and (ii) a bend-limiting portion which surrounds the cable in the region where it is joined to the connector, the device being made from a flexible material which is sufficiency stiff to limit the minimum bend radius of the cable under heavy side loading, said bend-limiting device including a plurality of circumferential grooves that extend at least part way around the device, extend into the axial bore, and are confined to the back half of the bend-limiting portion of the device for limiting the minimum bend radius of the cable under light side loading.

12. The jumper of claim 11 wherein the bend-limiting device includes a tapered cylinder portion having a diameter which is greater at one end where it attaches to the connector than at the other end where it receives the communications cable.

13. The jumper of claim 11 wherein the communications cable includes a light-carrying fiber.

* * * * *